(12) United States Patent
Wada

(10) Patent No.: US 6,899,431 B2
(45) Date of Patent: May 31, 2005

(54) IMAGE PROCESSING SYSTEM, PROJECTOR, INFORMATION STORAGE MEDIUM, AND IMAGE PROCESSING METHOD

(75) Inventor: Osamu Wada, Ina (JP)

(73) Assignee: Seiko Epson Corporation, Tokyo (JP)

( * ) Notice: Subject to any disclaimer, the term of this patent is extended or adjusted under 35 U.S.C. 154(b) by 97 days.

(21) Appl. No.: 10/296,502

(22) PCT Filed: Mar. 25, 2002

(86) PCT No.: PCT/JP02/02835

§ 371 (c)(1),
(2), (4) Date: Nov. 25, 2002

(87) PCT Pub. No.: WO02/078356

PCT Pub. Date: Oct. 3, 2002

(65) Prior Publication Data

US 2004/0212783 A1 Oct. 28, 2004

(30) Foreign Application Priority Data

Mar. 26, 2001 (JP) .......................................... 2001-86778

(51) Int. Cl.⁷ .......................... G03B 21/00; G06K 9/00; H04N 1/40; H04N 1/46; G03F 3/08
(52) U.S. Cl. .......................... 353/31; 353/122; 382/167; 358/2.1; 358/515; 358/518
(58) Field of Search ................................. 382/162, 167; 358/2.1, 527, 515, 517, 518; 353/31, 121

(56) References Cited

U.S. PATENT DOCUMENTS

| | | | |
|---|---|---|---|
| 5,218,647 A | 6/1993 | Blonstein et al. | ............ 382/166 |
| 5,867,286 A | 2/1999 | Lee et al. | ..................... 358/523 |
| 5,987,167 A | 11/1999 | Inoue | ......................... 382/167 |
| 6,201,530 B1 | 3/2001 | Thadani et al. | ............. 345/593 |
| 6,765,585 B2 * | 7/2004 | Wada | .......................... 345/589 |
| 2001/0045984 A1 | 11/2001 | Itakura | ..................... 348/222.1 |
| 2002/0154138 A1 * | 10/2002 | Wada et al. | ................. 345/600 |
| 2002/0171766 A1 * | 11/2002 | Wada | .......................... 348/602 |
| 2002/0180766 A1 * | 12/2002 | Wada | .......................... 345/690 |
| 2003/0007098 A1 * | 1/2003 | Wada | .......................... 348/603 |
| 2003/0011563 A1 * | 1/2003 | Wada | .......................... 345/156 |
| 2003/0179211 A1 * | 9/2003 | Wada et al. | ................. 345/589 |

FOREIGN PATENT DOCUMENTS

| | | |
|---|---|---|
| EP | 1 079 605 A2 | 2/2001 |
| JP | A 1-134235 | 5/1989 |
| JP | 05-120416 | 5/1993 |
| JP | A 6-217338 | 8/1994 |
| JP | A 9-80849 | 3/1997 |
| JP | A 9-186896 | 7/1997 |
| JP | A 10-308950 | 11/1998 |
| JP | A 11-215386 | 8/1999 |
| JP | A 2000-152269 | 5/2000 |
| JP | 2000-311243 | 11/2000 |
| JP | A 2001-8220 | 1/2001 |
| JP | 2001-008044 | 1/2001 |
| JP | 2002-263304 | 9/2002 |

* cited by examiner

Primary Examiner—Judy Nguyen
Assistant Examiner—Magda Cruz
(74) Attorney, Agent, or Firm—Oliff & Berridge, PLC

(57) ABSTRACT

To provide an image processing system, information storage medium, and image processing method capable of converting image data in order to reproduce a target color, with a smaller storage capacity, the present invention provides a conversion data generation section (130) which generates color-conversion data for each of R, G, and B image signal values; a conversion data storage section (123) which stores that color-conversion data; a conversion section (125) which derives desired color-conversion data for each of the R, G, and B image signal values corresponding to input signal values; and an integration section (127) which integrates the derived plurality of color-conversion data to obtain R3, G3, and B3 image signal values.

22 Claims, 8 Drawing Sheets

FIG. 4

| BEFORE COLOR CONVERSION | AFTER COLOR CONVERSION ||||||||| 
| | R ||| G ||| B |||
| | R | G | B | R | G | B | R | G | B |
|---|---|---|---|---|---|---|---|---|---|
| 255 | 250 | 0 | 8 | 5 | 189 | 15 | 0 | 12 | 196 |
| ⋮ | ⋮ | ⋮ | ⋮ | ⋮ | ⋮ | ⋮ | ⋮ | ⋮ | ⋮ |
| 125 | 122 | 0 | 4 | 2 | 93 | 8 | 0 | 6 | 96 |
| ⋮ | ⋮ | ⋮ | ⋮ | ⋮ | ⋮ | ⋮ | ⋮ | ⋮ | ⋮ |
| 0 | 0 | 0 | 0 | 0 | 0 | 0 | 0 | 0 | 0 |

FIG. 7

| BEFORE COLOR CONVERSION | AFTER COLOR CONVERSION | | | | | | | | |
|---|---|---|---|---|---|---|---|---|---|
| | R | | | G | | | B | | |
| | R | G | B | R | G | B | R | G | B |
| 1~255 | 0.98 | 0.00 | 0.03 | 0.02 | 0.74 | 0.06 | 0.00 | 0.05 | 0.77 |
| 0 | 0 | 0 | 0 | 0 | 0 | 0 | 0 | 0 | 0 |

IMAGE PROCESSING SYSTEM, PROJECTOR, INFORMATION STORAGE MEDIUM, AND IMAGE PROCESSING METHOD

This application is a 371 of PCT/JP02/02835 filed on Mar. 25, 2002.

TECHNICAL FIELD

The present invention relates to an image processing system, a projector, information storage medium, and image processing method capable of performing conversions, of image data for the reproduction of a target color.

BACKGROUND OF ART

In general, when color conversion is performed on image data in order to reproduce a target color (such as a color that conforms to a standard such as sRGB), the color is converted by a combination of a three-dimensional look-up table (hereinafter referred to as "3D-LUT") and interpolation calculations.

Methods could be considered that represent combinations of all image signals (such as an R signal, a G signal, and a B signal, by way of example) as a 3D-LUT, but this would require something on the order of 50 megabytes for a three-color, eight-bit system, making it necessary to provide a huge storage capacity.

In addition, interpolation calculations using eight points are required for interpolation, so that such a method would require a large amount of computational time.

To shorten this computational time, a method is proposed whereby a cube comprising a subject point in a 3D-LUT space is divided and a triangular pyramid including a subject point is used, in other words, interpolation calculations are performed by using four points.

However, the derivation of these four points and the interpolation calculations themselves are complicated and take a lot of computational time.

It is therefore important to shorten the time required for color conversion, particularly when overwriting an image in real time at a rate of 60 times a second, as with a moving image.

DISCLOSURE OF INVENTION

The present invention was devised in the light of the above-described technical problems, with the objective of providing an image processing system, a projector, an information storage medium, and an image processing method that make it possible to perform color conversion with a smaller storage capacity and also a shorter computational time, when converting image data in order to reproduce a target color.

(1) In order to solve the above-described technical problems, an image processing system in accordance with the present invention relates to an image processing system which converts image data that is expressed by a plurality of types of image signal values, in order to reproduce a target color, the image processing system comprising:

color conversion means for converting the image data, based on predetermined color-conversion data, wherein the color-conversion data includes signal-correspondence data for creating a correspondence between the image signal values after color conversion and the plurality of types of the image signal values before color conversion, for each of the types of the image signal values, and wherein the color conversion means includes:

means for performing color conversion on the image signal values, based on the image signal values that are input and the signal-correspondence data, for each of the types of the image signal values; and means for integrating the image signal values that have been subjected to color conversion, for each of the types of the image signal values.

(2) An image processing system in accordance with the present invention also relates an image processing system which converts image data that is expressed by a plurality of types of image signal values, in order to reproduce a target color, the image processing system comprising:

a color conversion section which converts the image data, based on predetermined color-conversion data, wherein the color-conversion data includes signal-correspondence data for creating a correspondence between the image signal values after color conversion and the plurality of types of the image signal values before color conversion, for each of the types of the image signal values, and wherein the color conversion section includes:

a conversion section which performs color conversion on the image signal values, based on the image signal values that are input and the signal-correspondence data, for each of the types of the image signal values; and an integration section which integrates the image signal values that have been subjected to color conversion, for each of the types of the image signal values.

(3) A projector in accordance with the present invention relates to a projector which receives image data that is expressed by a plurality of types of image signal values, comprising:

color conversion means for converting the image data, based on predetermined color-conversion data, wherein the color-conversion data includes signal-correspondence data for creating a correspondence between the image signal values after color conversion and the plurality of types of the image signal values before color conversion, for each of the types of the image signal values, and wherein the color conversion means includes:

means for performing color conversion on the image signal values, based on the image signal values that are input and the signal-correspondence data, for each of the types of the image signal values; and means for integrating the image signal values that have been subjected to color conversion, for each of the types of the image signal values.

(4) A projector in accordance with the present invention relates to a projector which receives image data that is expressed by a plurality of types of image signal values, comprising:

a color conversion section for converting the image data, based on predetermined color-conversion data, wherein the color-conversion data includes signal-correspondence data for creating a correspondence between the image signal values after color conversion and the plurality of types of the image signal values before color conversion, for each of the types of the image signal values, and wherein the color conversion section includes:

a conversion section which performs color conversion on the image signal values, based on the image signal values tht are input and the signal-correspondence data, for each of the types of the image signal values; and an integration section which integrates the image signal values that have been subjected to color conversion, for each of the types of the image signal values.

(5) An information storage medium in accordance with the present invention relates to an computer-readable information storage medium which stores a program for converting image data that is expressed by a plurality of types of image signal values, in order to reproduce a target color, wherein the information storage medium stores a program for causing a computer to function as color conversion means for converting the image data, based on predetermined color-conversion data, wherein the color-conversion data includes signal-correspondence data for creating a correspondence between the image signal values after color conversion and the plurality of types of the image signal values before color conversion, for each of the types of the image signal values, and wherein the color conversion means includes:

means for performing color conversion on the image signal values, based on the image signal values that are input and the signal-correspondence data, for each of the types of the image signal values; and means for integrating the image signal values that have been subjected to color conversion, for each of the types of the image signal values.

(6) An image processing method in accordance with the present invention relates to an image processing method for converting image data that is expressed by a plurality of types of image signal values, based on predetermined color-conversion data, in order to reproduce a target color, wherein the color-conversion data includes signal-correspondence data for creating a correspondence between the image signal values after color conversion and the plurality of types of the image signal values before color conversion, for each of the types of the image signal values, wherein color conversion is performed on the image signal values, based on the image signal values that are input and the signal-correspondence data, for each of the types of the image signal values, and wherein the image signal values that have been subjected to color conversion are integrated for each of the types of the image signal value.

The present invention makes it possible to obtain desired image signal values by obtaining image signal values expressed by the plurality of types of image signal values, for each of the types of the image signal values, then integrating the thus-obtained image signal values for each of the types of the image signal value.

This makes it possible to reduce the storage capacity required for color-conversion data and shorten the computational time taken by color conversion.

In other words, space on the order of 50 megabytes is necessary for a 3D-LUT for three colors presented by 8 bits, as described above. On the other hand, the present invention makes it possible to reduce this to only 24-bit×256×3 colors=2304 bytes.

Since the only algorithms used in the calculations during color conversion is integrations in other words, simply retrieving and summing signal-correspondence data, it is possible to reduce the computational time in comparison with the conventional method using means such as linear interpolation.

(7) This image processing system may further comprise color-conversion data generation means for generating the color-conversion data corresponding to the target color in a predetermined state.

(8) This information storage medium may store a program for causing a computer to function as color-conversion data generation means for generating the color-conversion data corresponding to the target color in a predetermined state.

(9) With this image processing method, the color-conversion data corresponding to the target color may be generated in a predetermined state.

This makes it possible to generate color-conversion data in a flexible manner, thus enabling color conversions corresponding to various different target colors.

(10) In this image processing system, information storage medium and image processing method, the signal-correspondence data may be expressed as ratios of the plurality of types of the image signal values.

This makes it possible to reduce the storage capacity that is necessary, by expressing the data as ratios. In other words, since the colors to be reproduced are the same, the ratios between the image signal values are the same in any grayscales. For example, if there are three colors (three types of signal value), nine data items would suffice.

(11) In this image processing system, information storage medium, and image processing method, the image data may be moving image data.

This makes it possible to perform color conversion in real time, thus enabling convenient color conversions of moving image data.

(12) In this image processing system and information storage medium, the color-conversion data generation means may generate the color-conversion data based on environmental information which represents a viewing environment.

(13) In this image processing method, the signal-correspondence data may be expressed as ratios of the plurality of types of the image signal values.

This would enable color conversions suited to the viewing environment, even when the target color has been altered by the viewing environment.

(14) In this image processing system and information storage medium, the color-conversion data generation means may generate the color-conversion data during image calibration.

(15) With this image processing method, the color-conversion data may be generated during image calibration.

This makes it possible to generate accurate color-conversion data in correspondences to a calibration instruction, by generating the color-conversion data during image calibration.

(16) This image processing system may be formed as a projector which projects an image based on the converted image data.

(17) With this image processing method, an image may be projected based on the converted image data.

This makes it possible to reproduce accurate colors matched to the viewing environment when using a projector or the like to project an image on a screen or the like, taking into account the effects of factors such as the type of that screen.

BRIEF DESCRIPTION OF DRAWINGS

FIG. 4 is a schematic diagram of conversion data in accordance with an example of this embodiment.

FIG. 7 is a schematic diagram of conversion data in accordance with another example of this embodiment.

BEST MODE FOR CARRYING OUT THE INVENTION

The description below relates to a case in which the present invention is applied to an image processing system which uses a liquid-crystal projector to project a moving image, by way of example, with reference to the accompanying figures. It should be noted that the embodiments described below do not in any way limit the scope of the present invention as laid out in the claims herein. In addition, the entirety of the configuration described with reference to these embodiments is not limited to being essential structural components of the present invention.

DESCRIPTION OF OVERALL SYSTEM

Figure 1:
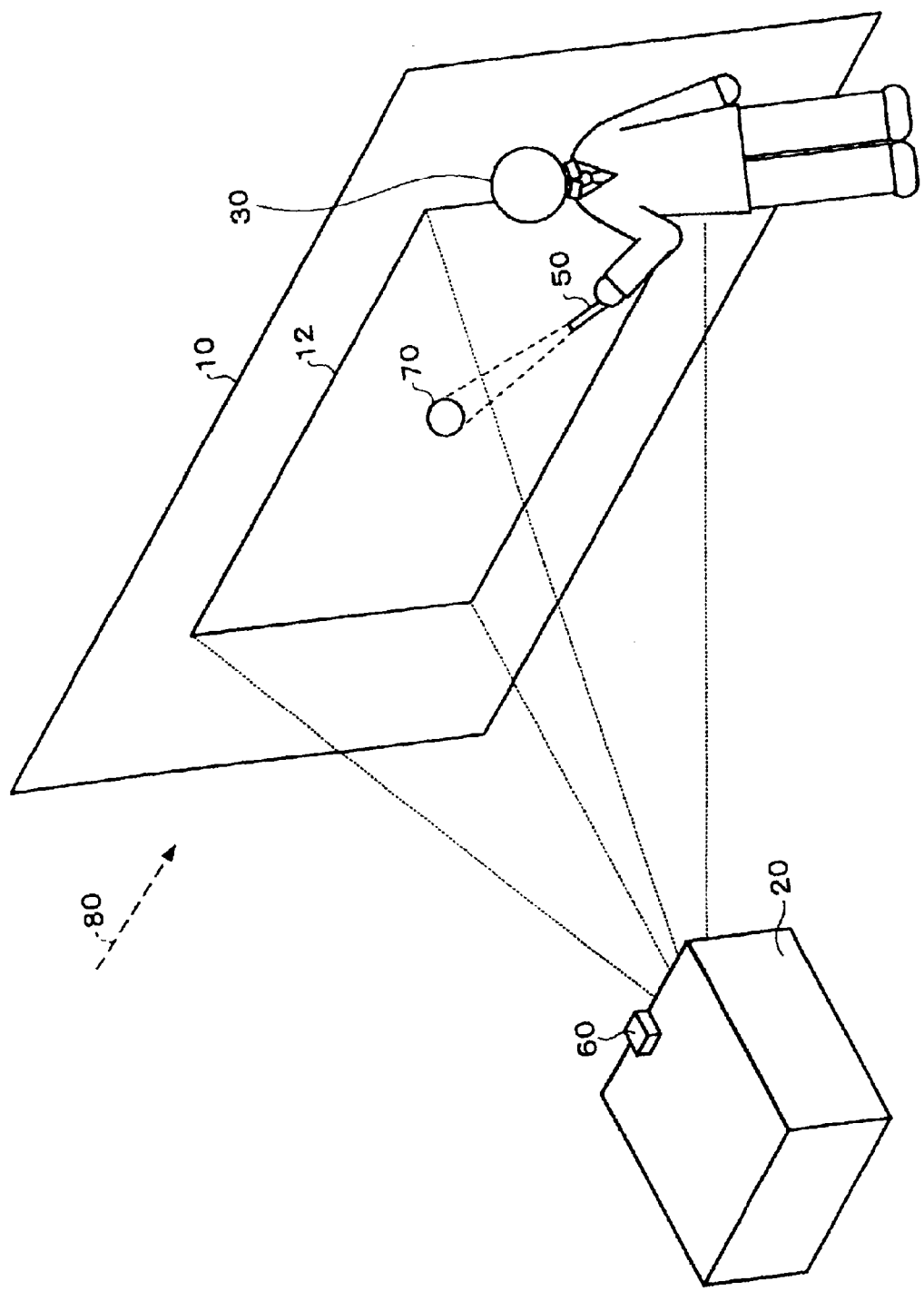
FIG. 1 is illustrative of an image processing system in accordance with an example of this embodiment.

A schematic illustrative view shown in FIG. 1 is of an image display system in accordance with an example of this embodiment of the present invention.

A projector 20, which is a projection type of display device provided substantially facing a screen 10, projects a moving image and a still image for a predetermined presentation. A presenter 30 gives a presentation to an audience, while using a light spot 70 projected from a laser pointer 50 to point at a desired position of an image in an image display region 12, which is a display area on the screen 10.

During such a presentation, the image appearance on the image display region 12 will vary greatly, depending on ambient light 80. Even when the projector 20 displays the same white, for example, it could seem to be white with a yellow cast or white with a blue cast, depending on the type of the screen 10. Even when the same white is displayed by the projector 20, it could seem to be a bright white or a dull white if the ambient light 90 differs.

Recently, the projector 20 has become smaller and easy to transport. For that reason, it has become possible for the presenter 30 to give presentations at a client's location, by way of example, but it is difficult to adjust colors to match the environment at the client's location and the manual adjustment of colors at the client's location takes too much time.

With a conventional projector, only color conversion is performed, based on an input-output profile that indicates the input-output characteristics that are specific to that projector, and there is no consideration of the viewing environment in which the image will be projected. Note that "profile" in this case refers to characteristic data.

However, it is difficult to ensure that the color appearance is uniform in this manner, without taking the viewing environment into account as described above. The color appearance is detected by three factors: light, the reflection or transmission of light by objects, and vision.

This embodiment of the invention implements an image processing system that is capable or reproducing suitable image colors by ensuring that the projector 20 which possesses this image processing system detects the viewing environment, taking into account the light and the reflection or transmission of that light by objects.

When displaying such an image, however, the image colors are converted to enable reproduction of the target colors that is suitable for the viewing environment in which the image processing system is used, as target colors that conform to a standard such as sRGB.

However, with the conventional method, this image color conversion necessitates a huge amount of storage capacity for the 3D-LUT and the interpolation calculations require large amounts of computational time.

Figure 2:
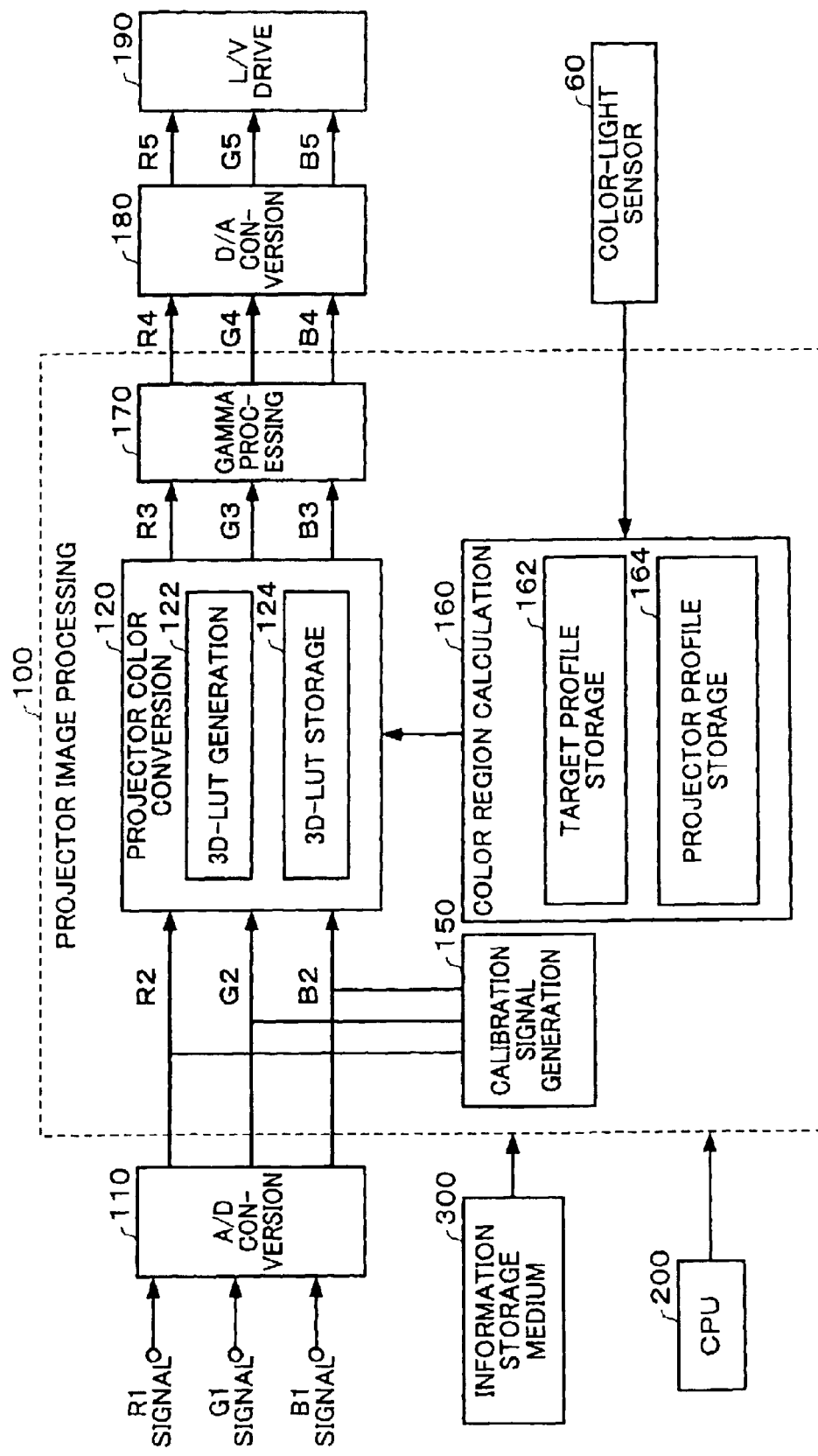
FIG. 2 shows an example of the functional blocks of a projector image processing section within a conventional projector.

An example of the functional blocks of a projector image processing section 100 within a conventional projector is shown in FIG. 2.

The projector inputs an R1 signal, a G1 signal, and a B1 signal (which form RGB signals in analog format, sent from a PC or the like) to an A/D conversion section 110, and uses the projector image processing section 100 controlled by a CPU 200 to perform color conversion and gamma processing on an R2 signal, a G2 signal, and a B2 signal of digital form.

The projector then inputs image signal values, which are obtained by subjecting an R3 signal value, a G3 signal value, and a B3 signal value to gamma processing to obtain an R4 signal value, a G4 signal value, and a B4 signal value, to a D/A conversion section 180; inputs an R5 signal, a G5 signal, and a B5 signal that have been converted into analog form to a light valve (L/V) drive section 190; and projects an image by driving liquid crystal light valves.

The projector image processing section 100 includes a projector color conversion section 120, a gamma processing section 170, a color gamut calculation section 160, and a calibration signal generation section 150.

The calibration signal generation section 150 generates calibration image signals. These calibration image signals are input to the projector color conversion section 120 as an R2 signal, G2 signal, and B2 signal in digital form, in a similar manner to the signals output from the A/D conversion section 110.

Since the calibration image signals are generated within the projector 20 in this manner, calibration can be done by the projector 20 itself, without having to input calibration image signals to the projector 20 from an external input device such as a PC.

The projector color conversion section 120 references a projector profile that is managed by a projector profile storage section 164 to convert the RGB signals (R2 signal, G2 signal, and B2 signal) from the calibration signal generation section 150 into digital RGB signals (R3 signal, G3 signal, and B3 signal) suitable for projector output.

The projector color conversion section 120 includes a 3D-LUT generation section 122 that generates a 3D-LUT for converting each of the digital signal values (R2, G2, and B2) and a 3D-LUT storage section 124 that stores the thus-generated 3D-LUT.

More specifically, the 3D-LUT generation section 122 generates a 3D-LUT that enables the reproduction of the color gamut calculated by the color gamut calculation section 160.

The description now turns to the color gamut calculation section 160.

The color gamut calculation section 160 includes a target profile storage section 162 and a projector profile storage section 164. More specifically, the color gamut calculation section 160 calculates a color gamut in such a manner as to obtain the preferred colors selected by the user and also appearance of image colors that conforms to the viewing environment, based on a target profile, environmental information from a color-light sensor 60, and a projector profile.

Note that the "target profile" in this case is a type of input-output characteristic data for the colors that will be the target. The "projector profile" is a type of input-output characteristic data corresponding to the type of projector.

The gamma processing section 170 performs gamma processing on the image signals (R3 signal, G3 signal, and B3 signal) that have been subjected to color conversion by the projector color conversion section 120.

In a conventional art, an increased capacity is required for the 3D-LUT stored in the 3D-LUT storage section 124, in order to perform color conversion using this 3D-LUT. It is also necessary to generate the 3D-LUT anew every time the viewing environment changes, interpolation is necessary, and the color conversion takes time.

In particular, the color conversion during the display of a moving image as in this embodiment takes so much time, it becomes impossible to display the moving image in real time.

With this embodiment of the invention, signal-correspondence data is used as color-conversion data instead of a 3D-LUT, to indicate correspondences between each image signal value after color conversion and a plurality of types of image signal values before color conversion, for each of the types of image signal value. This signal-correspondence data is used in the color conversion, then the image signal values obtained by the color conversion are integrated for each of the types of image signal value.

This reduces the storage capacity necessary for the color-conversion data, enabling a reduction in the computational time required for the color conversion.

The description now turns to the functional blocks of the projector image processing section that function as the image processing system within the projector 20 in accordance with an example of this embodiment.

Figure 3:
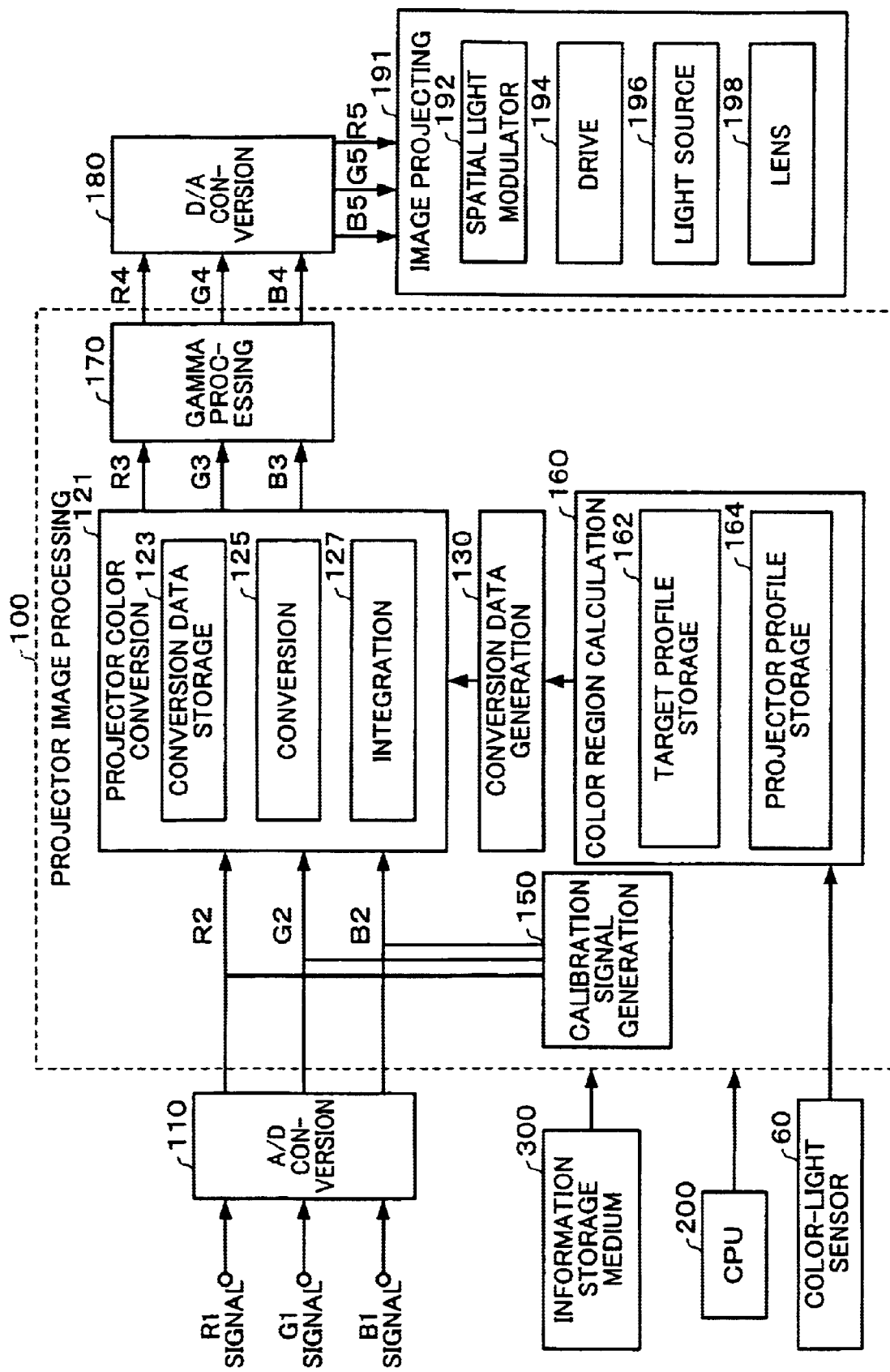
FIG. 3 is a functional block diagram of the projector image processing section within a projector in accordance with an example of this embodiment.

A functional block diagram of the projector image processing section 100 within the projector 20 in accordance with an example of this embodiment is shown in FIG. 3.

The projector image processing section 100 of FIG. 3 differs from the projector image processing section 100 of FIG. 2 in including a conversion data generation section 130 that generates conversion data for converting colors based on a color gamut obtained by the color gamut calculation section 160; a conversion data storage section 123 that stores the thus-generated conversion data; a conversion section 125 that performs color conversions of the image signal values for each input signal value, based on input image signal values and signal-correspondence data; and an integration section 127 that integrates the thus-converted image signal values for each type of image signal value.

Note that the conversion data storage section 123, the conversion section 125, and the integration section 127 are included within a projector color conversion section 121.

The image projecting section 191 comprises a spatial light modulator 192, a drive section 194 for driving the spatial light modulator 192, a light source 196 and a lens 198.

The drive section 194 drives the spatial light modulator 192 according to the image signals from the D/A conversion section 180. The image projecting section 191 projects the light from the light source 196 through the spatil light modulator 192 and lens 198.

A schematic diagram of conversion data in accordance with an example of this embodiment is shown in FIG. 4.

Since RGB signal values are used in this embodiment, signal-correspondence data is provided for each of the R signal value, the G signal value, and the B signal value. Note that the signal-correspondence data in this case represents the R. G, and B signal values before the color conversion.

Specifically, if the R, G, and B signal values are 255, 255, and 255 (in other words, for white), by way of example, the R signal value after the color conversion is represented by (R, G, B)=(250, 0, 8), the G signal value after the color conversion is represented by (R, G, B)=(5, 189, 15), and the B signal value after the color conversion is represented by (R, G, N)=(0, 12, 196).

Note that the necessity of expressing something that was originally expressed as a single image signal value as three image signal values is because the color gamut for reproducing the target color in the viewing environment differs from a standard color gamut and thus there is a displacement in the color gamut. For example, the RGB signal value of red in a standard environment is (R, G, B)=(255, 0, 0) but if the viewing environment changes it may become impossible to express it by the R signal value alone, even though it is red, so it would become necessary to use all of the R, G, and B signal values.

The integration section 127 calculates the sum of the R, G, and B image signal values converted by the conversion section 125. To reproduce the above-described white, the RGB signal values are expressed as (R, G, B)=(255, 201, 219).

Note that the specific numerical values given in FIG. 4 are simply examples and will differ according to the device, such as the projector 20, and the viewing environment.

The description now turns to the flow of processing, using the components shown in FIG. 3. With this embodiment of the invention, tasks such as calibration, determination of the viewing environment, and the generation of conversion data are done during pre-processing which is executed before the presentation, and color conversion is done during this processing at the time of the presentation.

Figure 5:
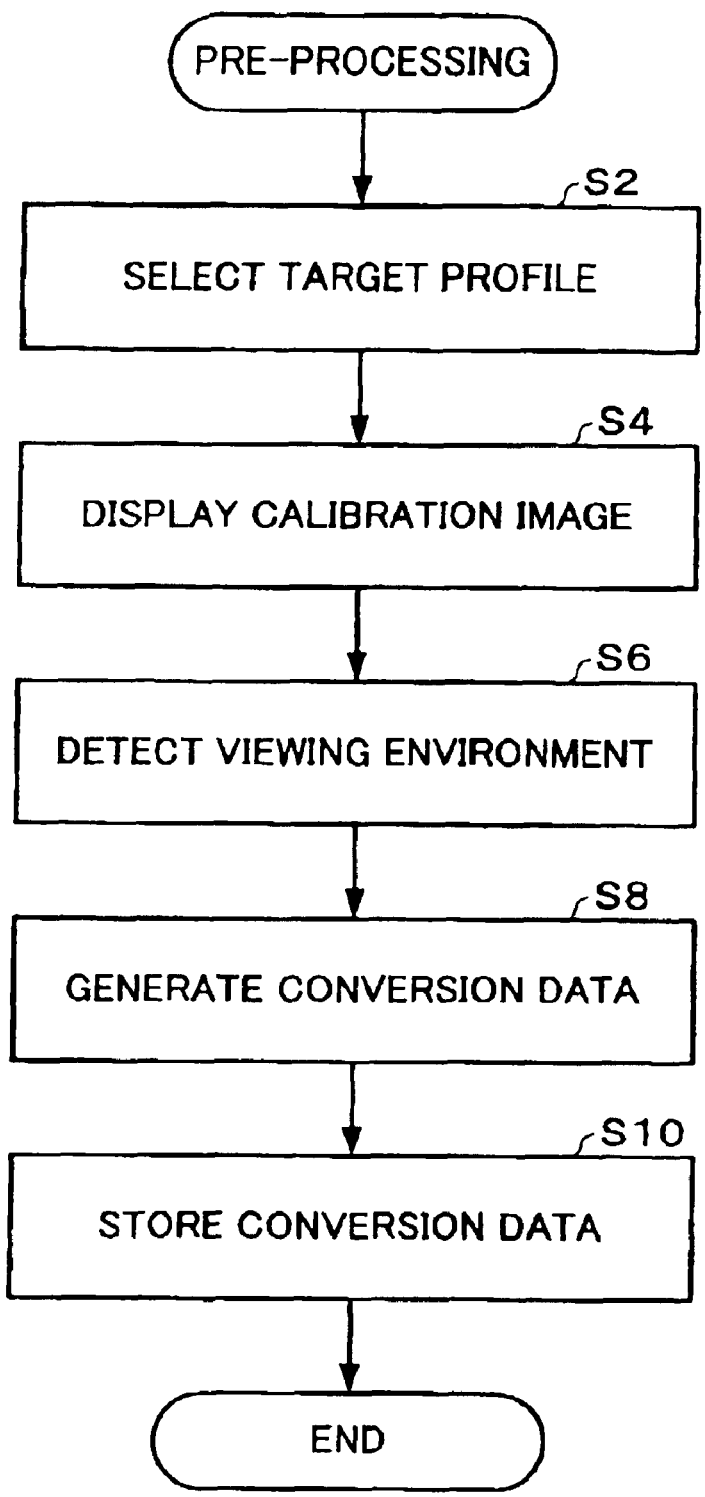
FIG. 5 is a flowchart of pre-processing in accordance with an example of this embodiment.

A flowchart of pre-processing in accordance with an example of this embodiment is shown in FIG. 5.

First of all, the color gamut calculation section 160 selects a target profile in accordance with the user's specification and the type of image (step S2).

After the target profile has been selected, the projector 20 generates calibration signal values (R2, G2, and B2) from the calibration signal generation section 150.

The calibration signal generation section 150 outputs those calibration signal values to the projector color conversion section 121.

The projector color conversion section 121 uses default conversion data (initial values) to convert a calibration signal and outputs it as RGB values (R3, G3, and B3).

The gamma processing section 170 subjects these RGB values (R3, G3, and B3) to gamma processing, and outputs them as RGB signal values (R4, G4, and B4).

The D/A conversion section 180 converts those RGB signal values (R4, G4, and B4) in digital form into RGB signals (R5, G5, and B5) in analog form. The image projecting section 191 drives liquid crystal light valves based on these analog RGB signals (R5, G5, and B5). The projector 20 projects a calibration image onto the image display region 12 (step S4).

In the state in which the calibration image is displayed on the image display region 12, the color-light sensor 60 detects tristimulus values as one of environment information presenting the viewing environment (step S6). Note that the detected tristimulus values could be either absolute values or relative values.

In this manner, the viewing environment can be detected more appropriately, by using the calibration image in the determination of the viewing environment. It is therefore possible to reproduce the appearance of the image, in a more suitable manner.

The conversion data generation section 130 generates conversion data based on the tristimulus values from the color-light sensor 60 and the selected target profile and projector profile (step S8), then stores that conversion data in the conversion data storage section 123 (step S10).

In this manner, the viewing environment is detected, conversion data corresponding to the thus-detected viewing environment is generated, and that data is stored in the conversion data storage section 123 during the pre-processing stage.

This makes it possible to generate accurate conversion data corresponding to the calibration instruction by generating conversion data during image calibration.

It also makes it possible to correspond with the environment and a target color flexibly during the presentation, by generating conversion data during calibration.

This processing is described below.

Figure 6:
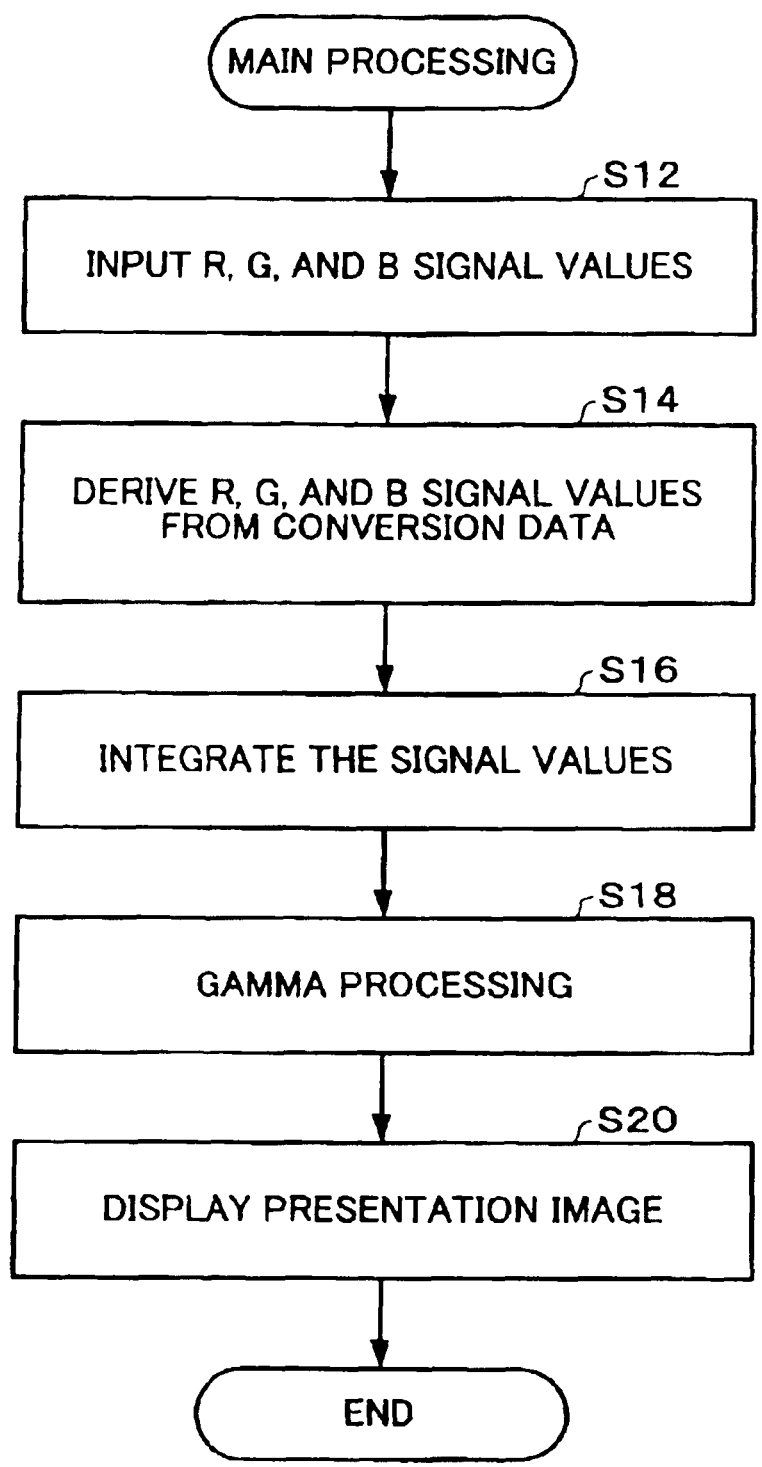
FIG. 6 is a flowchart of processing in accordance with an example of this embodiment.

A flowchart of the processing in accordance with an example of this embodiment is shown in FIG. 6.

The A/D conversion section 110 converts the analog RGB signals (R1, G1, and B1) that form a moving image into R, G, and B image signal values (R2. G2, and B2).

The projector color conversion section 121 inputs R, G, and B image signal values (R2, G2, and B2) that form digital image data (step S12).

The conversion section 125 derives corresponding R, G, and B image signal values from conversion data stored in the conversion data storage section 125, based on the thus-input R, G, and B image signal values (R2. G2, and B2) (step S14). If the conversion section 125 is to reproduce the above-described white, by way of example, the R signal value is derived as (R, G, B)=(250, 0, 8), the G signal value is derived as (R, G, B)=(5, 189, 15), and the B signal value is derived as (R, G, B)=(0, 12, 196). The conversion section 125 outputs the thus-derived R, G, and B signal values to the integration section 127.

This enables color conversion for each of the types of image signal value.

The integration section 127 integrates the R, G, and B image signal values that have been converted (derived) by the conversion section 125. For white, for example, the R, G, and B image signal values after the integration are (R, G, B)=(255, 201, 219). In other words, the R3 signal value is 255, the G3 signal value is 201, and the B3 signal value is 219.

The projector 20 subjects the color-converted R, G, and B image signal values (R3, G3, and B3) to gamma processing by the gamma processing section 170 then outputs them au R, G, and B image signal values (R4, G4, and B4) (step S18).

The digital RGB signal values (R4, G4, and B4) after gamma processing are converted into analog signals by the D/A conversion section 180, and the thus-converted analog RGB signals (R5, G5, and B5) are used for the display of the actual presentation image (step S20).

Note that if a moving image is to be displayed, the processing of steps S12 to S18 is done for each pixel within one image in practice, and since one image (one frame) is switched every 1/60 of a second, the processing of each image is done every 1/60 of a second.

In this manner, this embodiment makes it possible to reduce the storage area occupied by the color-conversion data by making the projector color conversion section 121 as the color-conversion data, by using conversion data related to each of the signals shown in FIG. 4 instead of using 3D-LUT, when performing the color conversion.

It is therefore unnecessary to perform complicated processing such as linear interpolation during color conversion, so that the projector color conversion section 121 can perform the color conversion rapidly by simply deriving and summing data.

This makes it possible to perform real-time processing, even when the projector image processing section 100 is processing moving-image data, thus enabling the display of a moving image that conforms to the target color.

With this embodiment, the projector 20 can project an image from consideration of the viewing environment, by using the color-light sensor 60 to detect the viewing environment.

This makes it possible for the projector 20 to display an image that is suited to the viewing environment in which the image is displayed, so that it can assimilate differences between display environments and thus display the same image regardless of the environment to which it is applied. The projector 20 is therefore able to reproduce substantially the same colors in a plurality of different locations, within a short time.

DESCRIPTION OF HARDWARE

Note that the hardware described below by way of example can be used to implement the above-described components.

Figure 8:
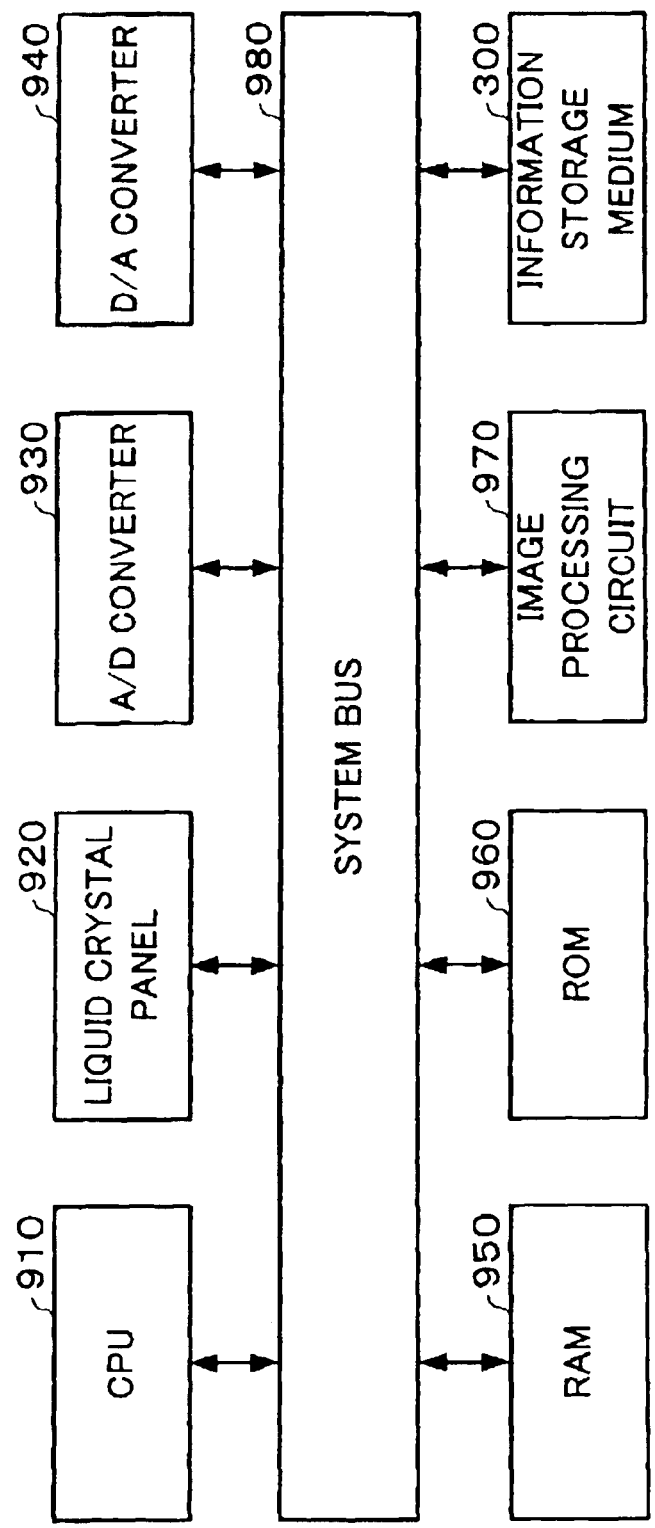
FIG. 8 is a hardware block diagram of the projector image processing section within a projector in accordance with an example of this embodiment.

FIG. 8 illustrates a hardware block diagram of the projector image processing section 100 within the projector 20 in accordance with an example of this embodiment.

For example, the A/D conversion section 110 could be implemented by an A/D converter 930 or the like; the D/A conversion section 180 by a D/A converter 940 or the like; the spatial light modulator 192 by a liquid crystal panel 920 or the like; the drive section 194 by a ROM 960 storing a liquid crystal light valve driver or the like; the conversion data generation section by a CPU 910 or the like, such as a CPU 910 and RAM 950; the gamma processing section 170 by an image processing circuit 970 and an ASIC or the like; and the projector color conversion section 121 and the color gamut calculation section 160 by a CPU 910 and RAM 950 or the like. These sections are configured to mutually deliver the information therebetween through a system bus 980. Note that these components could be implemented in a hardware fashion by circuits, or they could be implemented in a software fashion by drivers.

In addition, the functions of the components shown in FIG. 3 could be implemented by reading out a program from an information storage medium 300. The information storage medium 300 could be a CD-ROM, DVD-ROM, ROM, RAM, or HDD, by way of example, and the method of reading the program therefrom could be a direct method or an indirect method.

Instead of the information storage medium 300, it is possible to implement the above described functions by downloading a program to implement those functions, over a transfer path from a host device or the like.

The hardware described below could be employed for the color-light sensor 60.

For example, hardware that implements the color-light sensor 60 could have a color filter and photodiode that selectively pass each of the tristimulus values, an A/D converter that converts an analog signal from the photodiode into a digital signal, and an OP amp that amplifies that digital signal.

Note that present invention has been described above by way of a preferred embodiment thereof, but the application of the present invention is not limited to the above embodiment, Modifications The conversion data of FIG. 4 could be numerical values that are used without modification, by way of example, but it is also possible to use conversion data that is expressed as ratios of image signal values.

A schematic diagram of conversion data in accordance with another example of this embodiment is shown in FIG. 7.

The conversion data of FIG. 4 could be expressed as ratios between the image signal values as shown in FIG. 7 by way of example. If all of the R, G, and B signal values are zero, all of the converted image signal values will also be zero, so that it will only be necessary to store nine data items in the conversion data storage section 123 in practice.

In other words, if each of the R, G, and B signal values is between 1 and 255, the R signal value after the color conversion is expressed by (R:G:B)=(0.98:0.00:0.03), the G signal value after the color conversion is expressed by (R:G:B)=(0.02:0.74:0.06), and the B signal value after the color conversion is expressed by (R:G:B)=(0.00:0.05:0.77).

It is therefore sufficient to store only numerical values that represent these nine ratios in the conversion data storage section 123.

The method of using ratios as shown in FIG. 7 results in a slight increase in the computation load for calculating the ratios, in comparison with the method shown in FIG. 4 of using numerical values, in which it is necessary to store 9×256=2304 data items, but it enables a reduction in the amount of data in comparison with the case shown in FIG. 4.

The projector 20 was used in the above-described embodiments, but the present invention is not limited thereto and thus it can be applied to various other types of display means. Instead of a liquid-crystal projector, a display device such as a projector using a digital micromirror device (DMD), a cathode ray tube (CRT), a plasma display panel (PDP), a field emission display (FED) device, an electro-luminescence (EL) device, or a direct-vision type of liquid crystal display device could be used as such a display means. Note that DMD is a trademark registered to Texas Instruments Inc. of the USA. In addition, the projector is not limited to a front-projection type; it could equally well be a rear-projection type of projector.

It should be obvious that the present invention would also be effective when displaying images in applications that are not presentations, such as in meetings, for medical treatment, in the design or fashion world, in business activities, commercials, and in education, as well as for general-purpose image displays such as movies, TV, video, and games. It should also be obvious that the present invention is effective not only for moving image data, but also for the processing of still image data.

In addition, the present invention is also effective in circumstances other than the display of an image as a target color in sRGB space, such as displaying an image on a monitor or printing it on a printer, as a target color for an image color obtained by a scanner or an image color generated by a PC. In these cases too, the amount of data necessary for the color conversion can be reduced.

In the above described examples, RGB signal values were used but the present invention can equally well be applied to the use or CMY values or CMYK values.

The viewing environment determination means could be imaging means such as a CCD camera or a CMOS camera, instead of the color-light sensor 60.

Note that the above-described screen 10 could be of a reflective type or a transmissive type.

Note also that the functions of the above-described projector image processing section 100 of the projector 20 could be implemented by a simple image display device (such as the projector 20 itself) or by distribution between a plurality of processing devices (such as distributed processing between the projector 20 and a PC).

What is claim is:

1. An image processing system which converts image data that is expressed by a plurality of types of image signal values, in order to reproduce a target color, the image processing system comprising:

color conversion means for converting the image data, based on predetermined color-conversion data, wherein the color-conversion data includes signal-correspondence data for creating a correspondence between the image signal values after color conversion and the plurality of types of the image signal values before color conversion, for each of the types of the image signal values, and wherein the color conversion means includes:

means for performing color conversion on the image signal values, based on the image signal values that are input and the signal-correspondence data, for each of the types of the image signal values; and means for integrating the image signal values that have been subjected to color conversion, for each of the types of the image signal values.

2. The image processing system as defined by claim 1, further comprising:

color-conversion data generation means for generating the color-conversion data corresponding to the target color in a predetermined state.

3. The image processing system as defined by claim 2, wherein the color-conversion data generation means generates the color-conversion data based on environmental information which represents a viewing environment.

4. The image processing system as defined by claim 3, wherein the color-conversion data generation means generates the color-conversion data during image calibration.

5. The image processing system as defined by claim 1, wherein the signal-correspondence data is expressed as ratios of the plurality of types of the image signal values.

6. The image processing system as defined by claim 1, wherein the image data is moving image data.

7. An image processing system which converts image data that is expressed by a plurality of types of image signal values, in order to reproduce a target color, the image processing system comprising:

a color conversion section which converts the image data, based on predetermined color-conversion data, wherein the color-conversion data includes signal-correspondence data for creating a correspondence between the image signal values after color conversion and the plurality of types of the image signal values before color conversion, for each of the types of the image signal values, and wherein the color conversion section includes;
a conversion section which performs color conversion on the image signal values, based on the image signal values that are input and the signal-correspondence data, for each of the types of the image signal values; and an integration section which integrates the image signal values that have been subjected to color conversion, for each of the types of the image signal values.

8. A computer-readable information storage medium which stores a program for converting image data that is expressed by a plurality of types of image signal values, in order to reproduce a target color, wherein the information storage medium stores a program for causing a computer to function as color conversion means for converting the image data, based on predetermined color-conversion data, wherein the color-conversion data includes signal-correspondence data for creating a correspondence between the image signal values after color conversion and the plurality of types of the image signal values before color conversion, for each of the types of the image signal values, and wherein the color conversion means includes:
means for performing color conversion on the image signal values, based on the image signal values that are input and the signal-correspondence data, for each of the types of the image signal values; and means for integrating the image signal values that have been subjected to color conversion, for each of the types of the image signal values.

9. The information storage medium as defined by claim 8, storing a program for causing a computer to function as color-conversion data generation means for generating the color-conversion data corresponding to the target color in a predetermined state.

10. The information storage medium as defined by claim 9,
wherein the color-conversion data generation means generates the color-conversion data based on environmental information which represents a viewing environment.

11. The information storage medium as defined by claim 10,
wherein the color-conversion data generation means generates the color-conversion data during image calibration.

12. The information storage medium as defined by claim 8,
wherein the signal-correspondence data is expressed as ratios of the plurality of types of the image signal values.

13. The information storage medium as defined by claim 8,
wherein the image data is moving image data.

14. An image processing method for converting image data that is expressed by a plurality of types of image signal values, based on predetermined color-conversion data, in order to reproduce a target color, wherein the color-conversion data includes signal-correspondence data for creating a correspondence between the image signal values after color conversion and the plurality of types of the image signal values before color conversion, for each of the types of the image signal values, wherein color conversion is performed on the image signal values, based on the image signal values that are input and the signal-correspondence data, for each of the types of the image signal values, and wherein the image signal values that have been subjected to color conversion are integrated for each of the types of the image signal value.

15. The image processing method as defined by claim 14,
wherein the color-conversion data corresponding to the target color is generated in a predetermined state.

16. The image processing method as defined by claim 15,
wherein the color-conversion data is generated based on environmental information which represents a viewing environment.

17. The image processing method as defined by claim 16,
wherein the color-conversion data is generated during image calibration.

18. The image processing method as defined by claim 17,
wherein an image is projected based on the converted image data.

19. The image processing method as defined by claim 14,
wherein the signal-correspondence data is expressed as ratios of the plurality of types of the image signal values.

20. The image processing method as defined by claim 14,
wherein the image data is moving image data.

21. A projector which receives image data that is expressed by a plurality of types of image signal values, comprising:

color conversion means for converting the image data, based on predetermined color-conversion data, wherein the color-conversion data includes signal-correspondence data for creating a correspondence between the image signal values after color conversion and the plurality of types of the image signal values before color conversion, for each of the types of the image signal values, and wherein the color conversion means includes:
means for performing color conversion on the image signal values, based on the image signal values that are input and the signal-correspondence data, for each of the types of the image signal values; and means for integrating the image signal values that have been subjected to color conversion, for each of the types of the image signal values.

22. A projector which receives image data that is expressed by a plurality of types of image signals values, comprising:

a color conversion section for converting the image data, based on predetermined color-conversion data, wherein the color-conversion data includes signal-correspondence data for creating a correspondence between the image signal values after color conversion and the plurality of types of the image signal values before color conversion, for each of the types of the image signal values, and wherein the color conversion section includes:
a conversion section which performs color conversion on the image signal values, based on the image signal values that are input and the signal-correspondence data, for each of the types of the image signal values; and an integration section which integrates the image signal values that have been subjected to color conversion, for each of the types of the image signal values.

* * * * *